United States Patent [19]

Seko et al.

[11] Patent Number: 4,964,258
[45] Date of Patent: Oct. 23, 1990

[54] PACKAGING ARTICLE INCLUSION-PROOFING DEVICE FOR END-SEALING MECHANISM

[75] Inventors: Kiyoshi Seko; Masato Hatano; Shigeki Suzuki, all of Nagoya, Japan

[73] Assignee: Fuji Machinery Company Ltd., Nagoya, Japan

[21] Appl. No.: 267,945

[22] Filed: Nov. 7, 1988

[30] Foreign Application Priority Data

Apr. 26, 1988 [JP] Japan .............................. 63-56097[U]

[51] Int. Cl.$^5$ .......................... B65B 9/06; B65B 57/16
[52] U.S. Cl. .......................................... 53/75; 53/55; 53/77; 53/550
[58] Field of Search ................... 53/75, 76, 64, 77, 55, 53/450, 550, 548

[56] References Cited

U.S. PATENT DOCUMENTS

| | | | |
|---|---|---|---|
| 4,506,488 | 3/1985 | Matt et al. | 53/55 |
| 4,574,566 | 3/1986 | Eaves et al. | 53/550 X |
| 4,722,168 | 2/1988 | Heaney | 53/550 X |
| 4,726,168 | 2/1988 | Seko | 53/550 X |

Primary Examiner—James F. Coan
Attorney, Agent, or Firm—Schwartz & Weinrieb

[57] ABSTRACT

A packaging article inclusion-proofing device for use with an end-sealing mechanism includes a motor for driving a conveyor for feeding packaging articles, with a predetermined space therebetween, into a packaging material which is disposed downstream and formed into a packaging tube, a motor for driving a series of rolls which deliver the packaging material, and a motor for driving an end-sealing mechanism for achieving end-sealing of the tubular packaging material. A deviation detecting sensor is provided for detecting any deviation of the packaging articles from a position at which they would normally be disposed during the end-sealing operation. A reference timing pulse generator generates predetermined reference timing pulses with respect to the feeding of the packaging articles. The motor drive for the end-sealing mechanism is stopped when a deviation timing signal, based upon a reference timing pulse, coincides with a deviation detection signal from the deviation detecting sensor, and the motor drive is restarted after a predetermined cycle time period elapses which would encompass all of the packaging articles disposed at the deviated positions, whereby proper synchronization of the articles, packaging material, and end-sealing is again achieved.

7 Claims, 6 Drawing Sheets

PACKAGING ARTICLE INCLUSION-PROOFING DEVICE FOR END-SEALING MECHANISM

FIELD OF THE INVENTION

This invention relates to a packaging article inclusion-proofing device for an end-sealing mechanism. More particularly, this invention relates to a packaging article inclusion-proofing device for an end-sealing mechanism which is designed to effectively prevent the inclusion of packaging articles (articles to be packaged) by means of the end-sealing mechanism which may be located at positions which deviate from their regular positions within a tubular packaging material within a bag-making/packing/packaging machine within which packaging articles are fed into a packaging material being fed out in the form of tube, and then center-sealing and end-sealing operations are performed upon the above packaging material so as to successively produce packages.

BACKGROUND OF THE INVENTION

There has been widely known a horizontal bag-making/packing/packaging machine in which, while packaging articles are successively fed into a packaging material such as, for example, a film and the like being fed out horizontally in the form of a tube through means of a bag-making device, the longitudinal end portions of the tubular packaging material containing the packaging articles are subjected to lengthwise sealing upon the overlapping faces thereof, followed by crosswise sealing and cutting of the tubular packaging material upon both ends of each packaging article so as to successively produce oblong pillow type packages. In this connection, the above longitudinal sealing is generally referred to as "center sealing"; whereas the crosswise sealing, "end sealing", and these latter mentioned terms will be used hereinafter, respectively.

The horizontal bag-making/packing/packaging machine mentioned above has various types of working mechanisms such as, for example, a conveyor for feeding packaging articles, feed rolls for delivering a packaging material, rolls for achieving center sealing, sealers for achieving end-sealing for the packaging material and others. The driving system in the conventional packaging machine described above has one main motor serving as a common driving source and is designed to drive a plurality of working mechanisms mentioned above in connection with one another through means of mechanical power transmission systems, respectively, using this motor.

As described above, when the tubular packaging material containing packaging articles is end-sealed on both sides of each packaging article, it is necessary that the packaging articles be disposed at regular positions relative to the timing of the sealing operation to be effected by means of the end-sealing mechanism. Generally, the packaging articles are fed by means of the conveyor disposed upstream into the tubular packaging material to be fed out downstream, unit by unit, at a predetermined feeding time in synchronization with the sealing time of the end-sealing mechanism. Accordingly, the packaging articles are arranged within the tubular packaging material at regular positions relative to the sealing time operation.

Therefore, within a horizontal bag-making/packing/packaging machine, it frequently happens that the packaging articles contained within the tubular packaging material deviate from their regular positions relative to the sealing time operation due to various factors such as, for example, vibration generated during the operation of the packaging machine, conditions effected by means of the shape of the packaging article, differences between the coefficient of friction of the packaging article and that of the tubular packaging material, errors in the timing of the feeding the packaging article, and the like. Thus, if the packaging article should deviate from the regular position within the tubular packaging material, the sealers provided within the end-sealing mechanism are interfered with through means of contact with the packaging article when the packaging article is passed through the end-sealing mechanism to effect the end-sealing and cutting operations, resulting in defective articles within the packages obtained.

Accordingly, within a conventional packaging machine having a purely mechanical operational system, such as, for example, as shown in Japanese Patent Publication No. 160209/1983, there is employed a system wherein a clutch and a clutch brake are attached, respectively, to a pair of endsealer shafts disposed in a vertical relationship, so that the clutch may be disengaged when a detector detects a deviation of a packaging article, whereby the brake is actuated so as to stop the end sealers.

However, the packaging machine having the above-mentioned construction involves problems wherein substantial mechanical shock is produced when the end-sealing mechanism is stopped or started as a result of the clutch on/off operation, the response time to the detection of the deviation so as to stop the sealers is slow, and the like. For such reasons, within the conventional packaging machine, the above construction was not applicable unless the machine is operated at a low rate of speed of approximately 20 rpm.

OBJECT OF THE INVENTION

This invention has been proposed in view of the disadvantages inherent in the above bag-making/packing/packaging machine and for suitably resolving the same, and is directed toward providing a packaging article inclusion-proofing device which can effectively prevent inclusion of packaging articles within the end-sealing mechanism when one or more of the packaging articles should deviate from their regular positions relative to the sealing time operation during the course of the transportation of the packaging articles which have been packed within the tubular packaging material toward the end-sealing mechanism and even under high-speed operation of the packaging machine.

SUMMARY OF THE INVENTION

For the purpose of overcoming the above problems and achieving the intended object, this invention provides a packaging article inclusion-proofing device for an end-sealing mechanism having:
- a motor for driving a conveyor for feeding packaging articles with a predetermined space therebetween into a packaging material which is delivered downstream and is formed into a tube;
- a motor for driving a series of rolls which deliver downstream the packaging material being formed into the tube; and
- a motor for driving an end-sealing mechanism for achieving end-sealing of the tubular packaging material in the crosswise direction relative to the line of feed of the packaging articles,
characterized by a deviation detecting sensor disposed at a predetermined position upstream of the end-sealing mechanism, for detecting any deviation of the packaging articles which have been inserted into the tubular packaging material relative to the portion to be end-sealed;

a reference timing pulse generating means which generates predetermined reference timing pulses for the timing of the feeding of the packaging articles from the conveyor; and a means for stopping the motor for driving the end-sealing mechanism under gradual deceleration conditions, provided that a deviation timing signal generated by the reference timing pulse generating means should coincide with the deviation detection signal generated by the deviation detecting sensor, and starting the motor, and gradually accelerating the same, after stopping the same for a predetermined number of cycles during which inclusion of the deviated packaging articles by means of the end-sealing mechanism is expected to occur, until the speed and phase thereof may be synchronized with those of the motor for driving the conveyor and those of the motor for feeding the packaging material.

As has been described above, according to the packaging article inclusion-proofing device for the end-sealing mechanism of this invention, the motor for driving the end-sealing mechanism is controlled so as to be stopped under gradual deceleration conditions after detecting a predetermined number of positional shifts when packaging articles contained within a tubular packaging material deviate from their regular positions during the course of their transportation toward the end-sealing mechanism, and then started under gradual acceleration conditions after being stopped for a period of time corresponding to the number of required cycles, that is, the number of deviated packaging articles. For example, even within a packaging machine which is operated at a high rate of speed of approximately 200 rpm, inclusion of packaging articles by means of the end-sealing mechanism can effectively be prevented. Moreover, the sealers in the end-sealing mechanism are controlled so that they may stop at positions completely separated from the packaging material, whereby burning of the packaging material can effectively be prevented. While the motor is gradually decelerated when it is to be stopped, it is gradually accelerated after it is started, whereby deviation of the packaging articles from their regular positions which may be caused by means of mechanical vibration and the like can be obviated even during high-speed operation.

BRIEF DESCRIPTION OF THE DRAWINGS

Various other objects, features, and attendant advantages of the present invention will become more apparent from the following detailed description, when considered in connection with the accompanying drawings, in which like reference characters have been used to designate like or corresponding parts throughout the several views, and wherein.

DETAILED DESCRIPTION OF THE INVENTION

Next, the packaging article inclusion-proofing device for end-sealing mechanism constructed according to this invention will be described by means of a suitable embodiment referring to the attached drawings.

(DRIVING SYSTEM OF PACKAGING MACHINE)

Figure 1:
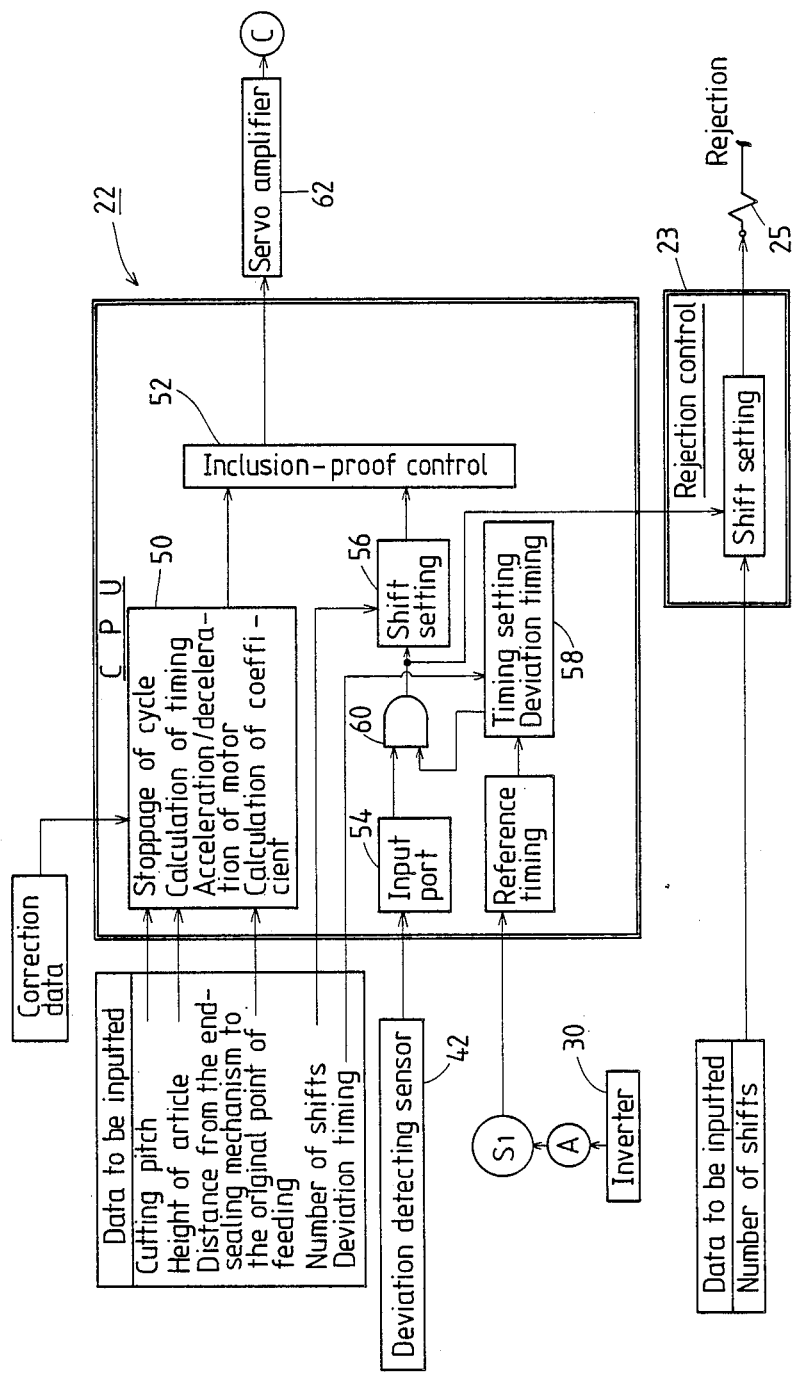
FIG. 1 is a block diagram illustrating an example of a control circuit to be employed within the packaging article inclusion-proofing device constructed according to the embodiment of this invention.
Figure 8:
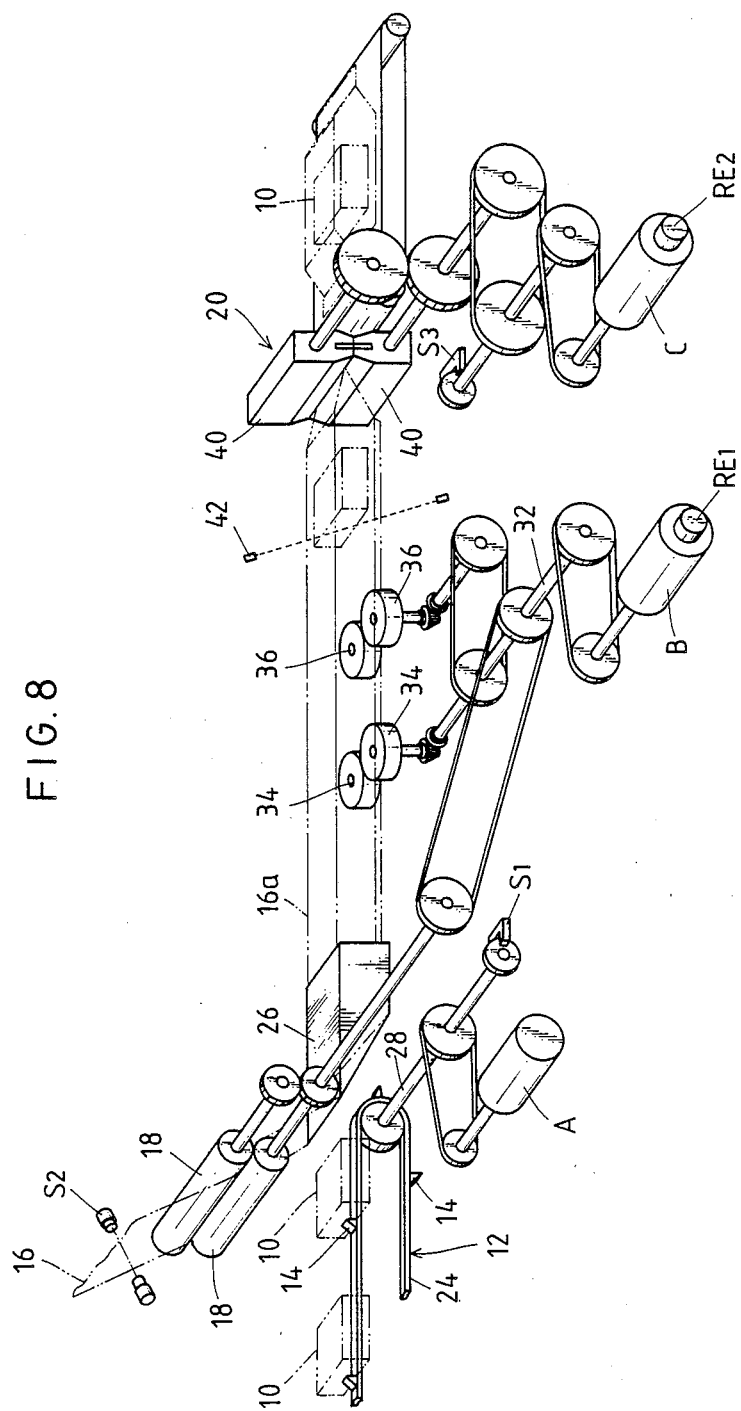
FIG. 8 is a schematic diagram wherein the packaging article inclusion-proofing device constructed according to the embodiment is employed within a triple motor-driven horizontal bag-making/packing/packaging machine.

FIG. 8 shows an embodiment wherein the packaging article inclusion-proofing device constructed according to this invention is employed within a triple motor-driven horizontal bag-making/packing/packaging machine. This packaging machine essentially comprises a motor A for driving a conveyor 12 for feeding packaging articles (articles to be packaged) 10, a servomotor B for driving rolls (feed rolls) 18 for delivering a packaging material 16, and a servomotor C for driving an end-sealing mechanism 20. The conveyor 12 is composed of an endless chain 24 and a plurality of attachments 14 fixed thereon with a predetermined space defined therebetween, so that the packaging articles 10 carried thereon under engagement with the attachments 14 may be fed into the packaging material 16 being formed into a tube through means of a bag-making device 26 disposed downstream of the conveyor 12. The conveyor 12 is driven by means of the motor A through means of a sprocket-chain transmission system provided for a drive shaft 28 as shown in FIG. 8. The above motor A is, for example, an AC induction motor and it is controlled so as to be operated at variable speeds by means of a variable speed controller 30 such as, for example, an inverter as shown in FIG. 1 or the like.

A reference timing pulse generating means $S_1$ typified by means of a rotary encoder is provided for the above drive shaft 28. This reference timing pulse generating means $S_1$ generates pulses at predetermined reference times for controlling the timing of the feeding of the packaging articles 10 unit by unit from the feed conveyor 12 with a predetermined interval, with a predetermined distance defined therebetween, downstream to the tubular packaging material 16. In this process, the pitch at which each of the packaging articles 10 is fed into the tubular packaging material 16 constitutes one cycle, which corresponds to a full rotation of 360° of the above rotary encoder. Accordingly, the present location of the packaging article 10 being transported upon the conveyor 12 can be known by converting the number of pulses generated by means of the rotary encoder into angular degrees.

The sheet-form packaging material 16 delivered from a feed source (not shown) comprising a roll of sheet material is supported between the above pair of feed rolls 18 so as to be delivered toward the bag-making device 26 disposed downstream of the conveyor 12. The packaging material 16 having been formed into a tubular bag 16a through means of this bag-making device 26 is fed downstream with the overlapping faces disposed along the longitudinal end portions thereof being supported between a pair of feed rolls 34. Furthermore, a pair of heat-sealing rolls 36 are provided so as to effect center-sealing of the above overlapped end portions of the packaging material 16 by pressing the same therebetween as they are fed toward the end sealing mechanism 20.

The above pair of feed rolls 18 are driven by means of the servo motor B through means of a belt-pulley transmission system as illustrated in FIG. 8. The power of the servomotor B is divided by means of a drive shaft 32 so as to synchronously drive the pair of feed rolls 34 and the heat-sealing rolls 36. Revolution of the servomotor B is constantly detected by means of a rotary encoder $RE_1$ so as to effect servo-actuated control of the servomotor B by feeding back the number of revolutions to the control circuit.

Furthermore, in the end-sealing mechanism 20 disposed downstream, a pair of rotary sealers 40 are disposed so as to oppose each other in a vertical relationship and are driven by means of the servomotor C through means of a belt-pulley transmission system so as to achieve uniform motion. This servomotor C is also constantly detected for its revolutions by means of a rotary encoder $RE_2$ so as to effect servo-actuated control of the servomotor C. As the sealers 40, there may suitably be employed, in place of the rotary sealing mechanism according to this embodiment, a so-called block motion sealing mechanism system in which sealers are moved horizontally and synchronously along the line of feeding of the tubular bag 16a, subsequently ascended so as to be spaced from the tubular bag 16a and retracted horizontally from each other, and then descended again for horizontal motion.

Figure 2:
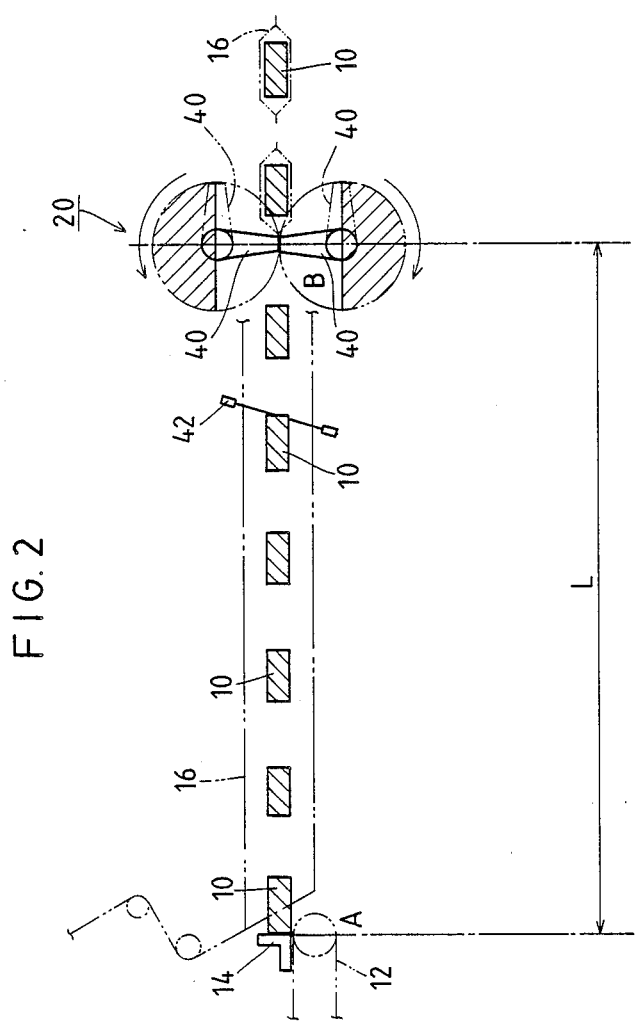
FIG. 2 illustrates schematically the state of the sealers in the end-sealing mechanism when they are stopped at positions where they are free from interference with the tubular packaging material.

As shown in FIGS. 2 and 8, a deviation detecting sensor 42 is disposed upstream of the end-sealing mechanism 20, which detects any deviation of the packaging articles 10 contained within the tubular bag 16a, if the packaging articles 10 should deviate from their regular positions relative to the seal timing operation of the end-sealing mechanism 20. Incidentally, when the pitch between any two attachments 14 disposed upon the conveyor 12 is designed to accept packaging articles 10 having different lengths, a construction is preferred wherein the position of the deviation detecting sensor 42 is adjustable or the deviation detecting sensor 42 is disposed so that it may detect any deviation of the largest possible packaging article 10, and corrections in numerical values can be achieved in the control circuit 22 to be described later.

Identification of the deviation by means of the deviation detecting sensor 42 is achieved by detecting the state wherein the packaging articles 10 being forwarded as inserted within the tubular bag 16a have not been disposed at their regular positions, respectively, relative to the seal timing operation of the end-sealing mechanism 20 and to output deviation detection signals to the control circuit 22 to be described later. As will be explained below in more detail, the control circuit 22 acts to decelerate the motor C which is the driving source for the end-sealing mechanism 20, to stop the same for the necessary number of cycles, and then start the motor C under gradual acceleration conditions, the same being followed by synchronization of the two motors A and B for the speeds and phases of the packaging articles and packaging material.

(CONTROL CIRCUIT)

FIG. 1 shows an example of a control circuit to be used within a packaging article inclusion-proofing device constructed according to the embodiment of this invention, wherein various data to be supplied from external sources are adapted to be operationally processed through means of a central processing unit (CPU) within the above circuit so as to give a necessary control command to the motor C for achieving the end-sealing operation. The control circuit 22 has an operational block 50 comprising an operational section for calculating the cycle stop time $Q_o$, and an operational section for calculating the gradual acceleration/deceleration coefficient of the motor C, and data, including (1) the cut pitch for cutting the packaging material 16, (2) the height of the packaging article 10, and (3) the distance L from the original point of feeding the packaging article 10 to the end-sealing mechanism 20, are inputted into this operational block 50 by means of a keyboard and the like.

In the above operational block 50, the time $Q_o$ for stopping the end-sealing cycle and the acceleration/deceleration coefficient of the motor C for driving the end-sealing mechanism 20 are calculated. Furthermore, orientation of the sealers 40 within the end-sealing mechanism 20 is also achieved by means of the operational block 50 for stopping them at positions where they may be free from contact with the tubular packaging material 16. The term "acceleration/deceleration coefficient of the motor C" used herein is intended to mean the degree of smoothness in the operation of the motor when it is accelerated or decelerated (that is, the degree to which the motor rotates slowly or rapidly), which is defined by means of a coefficient of, for example, 1 to 9. Accordingly, if the coefficient of the motor is set at 5, the deceleration for stopping the motor C or starting it with acceleration will be achieved within the range of 180° [360° (a full rotation of the reference timing pulse generating means $S_1$) x 5/10]. In addition, since the motor C operates under decelerated stopping and accelerated starting conditions, each of the above sealers 40 achieves a turn which corresponds to ½ rotation of the reference timing pulse generating means S', that is, a rotation of only 90° depending upon the above conditions. The rotation angle of the reference timing pulse generating means $S_1$ with respect to those of the sealers 40 is constantly maintained at a ratio of ½.

Incidentally, the acceleration/deceleration coefficient of the motor C and the cycle stop time $Q_o$ are adapted to be inputted into the above operational block 50, as necessary, as correction data. Thus, as shown in FIG. 1, the operational block 50 calculates the inputted data including the cut pitch for cutting the packaging material 16, the height of the packaging article 10 and the distance L from the original point of feeding the packaging articles 10 to the end-sealing mechanism 20 so as to give a control command to the inclusion-proofing control block 52.

The deviation detection signal from the deviation detecting sensor 42 is inputted into one of the terminals of an AND circuit 60 through means of an input port 54. The reference time provided from the above reference timing pulse generating means $S_1$ and the deviation time to be preset using a keyboard and the like are inputted into a timing setting section 58. Then, the timing setting section 58 outputs a deviation timing signal, based upon the reference timing signal, to the other terminal of the above AND circuit 60. This AND circuit 60 outputs a signal of "deviation present" to a shift setting means 56, provided that the deviation detection signal coincides with the deviation timing signal to be inputted through means of the timing setting section 58.

Into this shift setting means 56, the number of shifts to be defined by means of a keyboard and the like is inputted, and upon receipt of the "deviation present" signal, the shift setting means 56 is allowed to wait for a period of time based upon the required number of shifts and then outputs a command signal to the inclusion-proofing control block 52. Accordingly, the inclusion-proofing control block 52 gives a control command to the motor C for achieving end-sealing through means of a servo amplifier 62 so as to stop motor C under gradual deceleration conditions or start motor C under gradual acceleration conditions. Incidentally, when the motor C stops, a control is achieved so as to stop the above pair of rotary sealers 40 within the end-sealing mechanism 20 at positions (see FIG. 2) where they are free from contact with the tubular packaging material 16 based upon the value calculated within the operational block 50 from the inputted data including the cut pitch for cutting the packaging material 16, the height of the packaging article 10, and the distance from the original point of feeding the packaging article 10 to the end-sealing mechanism 20, as described above.

Furthermore, a rejection control section 23 is operatively connected to the above control circuit 22. This rejection control section 23 is adapted to compare the preliminary inputted data including the shift numbers and the like with the "deviation present" signal outputted from the AND circuit 60 so as to actuate, for example, a solenoid valve 25 in order to operate a thrusting means such as, for example, an air cylinder (not shown). Accordingly, any defective package with no end sealing applied thereto as a result of the detected deviation will be rejected away from the line.

Figure 3:
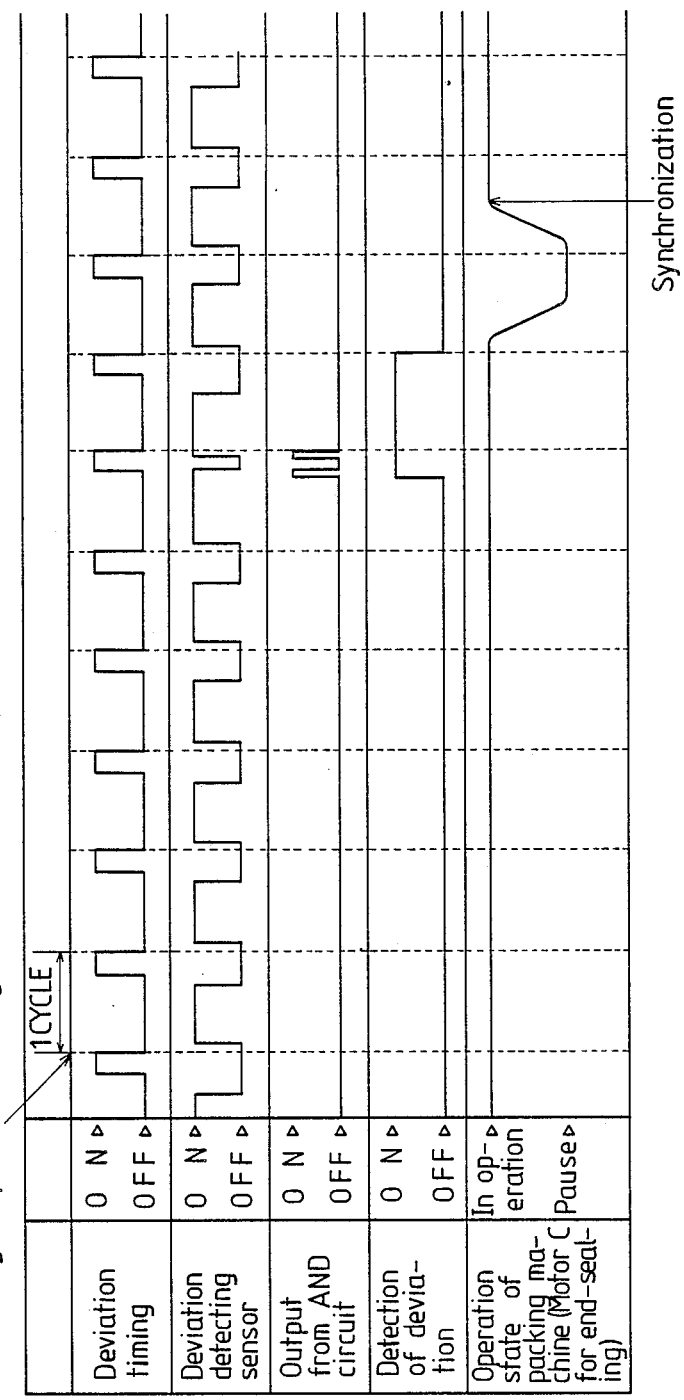
FIG. 3 is a timing chart of the deviation timing signals vs. the deviation detection signals.

Next, the function of the inclusion-proofing device constructed according to the embodiment having such aforenoted structure will now be described. As described above, deviation timing signals based upon the reference timing signals are outputted in the form of a pulse wave as shown in FIG. 3 from the timing setting section 58 shown in FIG. 1. These deviation timing signals are set for an angle range within which inclusion of a packaging article 10 by means of the above pair of sealers 40 within the above end-sealing mechanism is supposed to happen (the angle being based upon the original point of feeding as determined by means of the encoder within the reference timing pulse generating means $S_1$).

Figure 4:
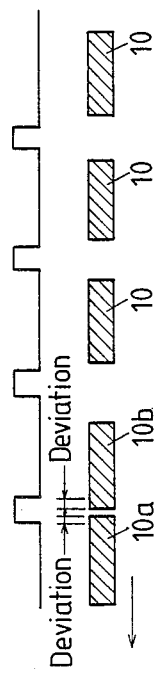
FIGS. 4, 5 and 6 are illustrations of timing periods showing the states of deviated packaging articles relative to the deviation timing signals.

The deviation detection signals from the deviation detecting sensor 42 are also outputted in the form of a pulse wave as shown in FIG. 3. When the packaging article 10 having been fed into the tubular packaging material 16 is located at a regular position relative to the seal timing operation of the end-sealing mechanism 20, the above packaging article 10 is interposed between the deviation timing pulses, that is, the packaging article 10 has not deviated from the regular position, as shown in FIG. 4. In such a situation, the deviation timing signal does not coincide with the deviation detection signal, as can be seen from FIG. 3. Accordingly, the inclusion-proofing control block 52 is not actuated.

Alternatively, when a deviation of the packaging article 10 occurs to a degree which is intolerable relative to the above deviation timing, as shown in FIG. 4, the increased value of the deviation timing signal becomes coincident with that of the deviation detection signal, as shown in FIG. 3, whereby the AND circuit 60 within the above control circuit 22 outputs a "deviation present" signal to the shift setting means 56, provided that the deviation timing signal from the timing setting section 58 coincides with the deviation detection signal from the deviation detecting sensor 42, as shown in FIG. 3. Thus, the shift setting means 56 outputs a control command to the inclusion-proofing control block 52 so as to stop the motor C for achieving end-sealing after waiting for a predetermined period corresponding to the preset number of shifts. Namely, the inclusion-proofing control block 52 gives a control command, after waiting for only one cycle since the deviation detecting sensor 42 has detected a deviation as shown in FIG. 3 when the number of shifts as input data has been preset at one, to the motor C for achieving end-sealing, so as to stop the same under gradual deceleration conditions through means of the servo amplifier 62. In the above situation, two packaging articles 10a and 10b successively deviate from their regular positions relative to the deviation timing, as can be seen from FIG. 4.

However, in the above situation, the rear end of the preceding packaging article 10a and the fore end of the succeeding packaging article 10b exhibit a deviation wherein the packaging articles are merely closer to each other, and the line for end-sealing and cutting which is common to both packaging articles 10a and 10b is retained. Accordingly, in such a situation, there is no need of stopping the end-sealing mechanism 20 for two cycles corresponding to the two packaging articles 10a and 10b, but stopping mechanism 20 for only one cycle corresponding to one packaging article 10 ma be enough.

After this stopping of the cycle, the motor C for achieving end-sealing is started under gradual acceleration conditions so as to allow the rotation speed and phase of the sealers 40 within the above end-sealing mechanism 20 to be synchronized with the speed of feeding the above packaging article 10 and the phase thereof and furthermore with the speed of delivering the packaging material 16 and the phase thereof.

Figure 5:
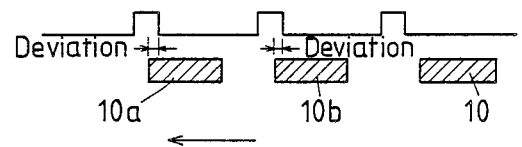
Figure 6:
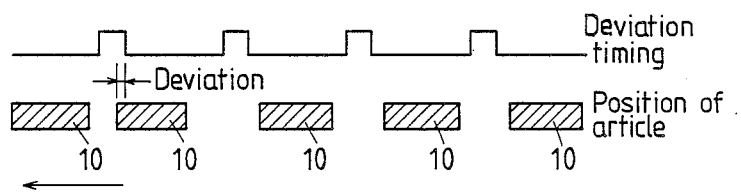

It should be noted that even when two successive packaging articles deviate from their regular positions, if each of the fore ends of the preceding packaging article 10a and the succeeding packaging article 10b exhibit deviations relative to the deviation timing as illustrated in FIG. 5, the line for end-sealing and cutting the packaging material 16 is still required independently for these two packaging articles. Accordingly, in such a situation, the end-sealing mechanism 20 is stopped for two cycles corresponding to the two packaging articles 10a and 10b. Furthermore, when the fore end of a packaging article 10 exhibits a deviation relative to the deviation timing as shown in FIG. 6, the end-sealing mechanism 20 is controlled so as to stop for one cycle corresponding to the packaging article 10.

Figure 7:
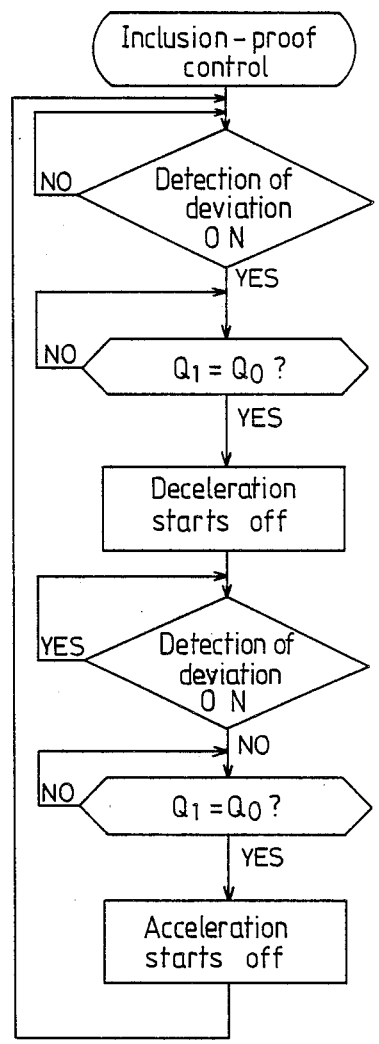
FIG. 7 is a flow chart of a packaging article inclusion-proofing device which is operative according to the embodiment.

Now, the operational control will be described referring to the flow chart shown in FIG. 7. Upon identification of any deviation of a packaging article 10 by means of the deviation detecting sensor 42, the motor C for driving the end-sealing mechanism 20 is allowed to wait until the present location $Q_1$ of the packaging article 10, which is being fed, and which will be known from the reference timing pulse generating means $S_1$, agrees with the cycle stop time $Q_o$, and is then decelerated. Upon commencement of the gradual deceleration of the motor C, the sealers 40 are controlled so as to achieve a 180° turn in accordance with an angle conversion of the encoder within the reference timing pulse generating means $S_1$, and as shown by means of the hatching in FIG. 2, and to stop at the point when the sealers 40 have reached the positions where they are free from contact with the tubular packaging material 16, that is, where the sealers 40 have achieved a 90° turn from their position of engagement. (In the present specification, the above control is achieved when the cycle stop time $Q_o$ has been set at the position of engagement of the sealers 40 and the original point P of transferring the packaging article 10 from the conveyor 12, provided that the acceleration/deceleration coefficient described above has been set at 5. In such a situation, although the sealers 40 are controlled so as to stop at the point where they have achieved a 180° turn in terms of an angle conversion of the encoder within the reference timing pulse generating means $S_1$, that is, ½ cycle, the shift angle of the sealers 40 themselves will only be 90° because of the decelerated stopping.)

It should be noted that the stop angle of the sealers 40 to be achieved as a result of the decelerated stopping will automatically be set to be at positions such that they are free from contact with the above tubular packaging material 16, since the preset values of the above acceleration/deceleration coefficient and the cycle stop time $Q_o$ are calculated from the inputted data to be inputted by means of a keyboard and the like including the cut pitch for cutting the packaging material 16, the height of the article, and the like, whereby contact between the sealers 40 with the packaging material 16 can be obviated when the sealers 40 are stopped in accordance with the aforenoted deceleration mode of operation so as to prevent undesired burning of the packaging material 16. Furthermore, the above conveyor 12 is operated at a steady state speed and with a phase irrespective of the decelerated stopping or accelerated starting of the above motors A and B.

The deviation detecting sensor 42 confirms if there is a deviation in any succeeding packaging article 10. If it is confirmed that there is no deviation, the motor C is allowed to wait until the present location $Q_1$ of the packaging article 10 being fed agrees with the cycle stop time $Q_o$ and then started. This motor C is gradually accelerated according to a preset acceleration coefficient, and the control is completed when the steady state speed and phase of the motor A for driving the feed conveyor 12 are synchronized with those of the motor B for delivering the packaging material 16.

As has been described heretofore, according to the device constructed according to this embodiment, the motor C for driving the end-sealing mechanism 20, after it is allowed to wait until the present location $Q_1$ of the packaging article 10 being fed agrees with the cycle stop time $Q_o$, is stopped under gradual deceleration conditions. After a stopping period comprising a predetermined time, the motor C is started under gradual acceleration conditions. Namely, the motor C does not undergo any abrupt stopping or starting operations, if a deviation of a packaging article 10 should be detected, so that neither vibration nor shock may suddenly be generated within the system itself whereby the effects of such deviation of the packaging article 10 can effectively be prevented. Moreover, since the sealers 40 are allowed to be disposed at positions where they are completely free from contact with the tubular packaging material 16 when they are stopped, accidents such as melting or burning of the packaging material 16 as a result of the contact with the sealers 40 can effectively be prevented.

Obviously, many modifications are variations of the present invention are possible in light of the above teachings. It is therefore to be understood that within the scope of the appended claims, the present invention may be practiced otherwise than an specifically described herein.

What is claimed is:

1. A packaging article inclusion-proofing device for an end-sealing mechanism, comprising:

a first motor for driving a conveyor for feeding packaging articles with a predetermined amount of space defined therebetween into a packaging material which is delivered downstream and which is formed into a tube;

a second motor for driving a plurality of rolls which deliver said packaging material being formed into said tube;

a third motor for driving an end-sealing mechanism for achieving end-sealing of said tubular packaging material in a crosswise direction relative to said feeding of said packaging articles;

a deviation detecting sensor disposed at a predetermine deposition upstream of said end-sealing mechanism for detecting a predetermined amount of deviation of said packaging articles inserted within said tubular packaging material relative to the portion of said tubular packaging material to be end-sealed and for generating a signal indicative of said predetermined amount of detected deviation;

reference timing pulse generating means for generating predetermined reference timing pulse signals for the timing of said feeding of said packaging articles from said conveyor;

means for determining the coincidence between said deviation detection signal generated by said deviation detecting sensor and one of said reference timing pulse signals generated by said reference timing pulse generating means; and means for stopping said third motor for driving said end-sealing mechanism under gradual deceleration conditions in response to a determination of coincidence by said coincidence determining means between one of said reference timing pulse signals generated by said reference timing pulse generating means and said deviation detection signal generated from said deviation detecting sensor, and for starting said third motor for driving said end-sealing mechanism, after a duration of time wherein said third motor is stopped for a number of cycles in which inclusion of deviated packaging articles by said end-sealing mechanism is expected to occur, under gradual acceleration conditions so as to gradually accelerate said third motor until the speed and phase thereof may be synchronized with those of said first motor for driving said conveyor and those of said second motor for feeding said packaging material.

2. A packaging article inclusion-proofing device for an end-sealing mechanism according to claim 1, wherein:

said end-sealing mechanism comprises a pair of end-sealers; and there is further provided controlling means for stopping said pair of end-sealers at positions where they are free from contact with said packaging material when said third motor for achieving said end-sealing is stopped under said gradual deceleration conditions.

3. A packaging article inclusion-proofing device for an end-sealing mechanism according to claim 2, wherein:

said controlling means comprises a control block for stopping said pair of end-sealers of said end-sealing mechanism at said predetermined positions as a result of being based upon values calculated from inputted data characteristic of the packaging operation including the cut pitch for cutting said packaging material and the height of said packaging article.

4. A packaging article inclusion proofing device for an end-sealing mechanism as set forth in claim 1, wherein:

said reference timing pulse generating means comprises a rotary encoder operatively connected to said conveyor.

5. A packaging article inclusion-proofing device for an end-sealing mechanism as set forth in claim 2, wherein said controlling means further comprises:

a control circuit for calculating a gradual acceleration/deceleration coefficient for said third motor for driving said end-sealing mechanism whereby said third motor can be stopped and started under said gradual deceleration and gradual acceleration conditions.

6. A packaging article inclusion-proofing device for an end-sealing mechanism as set forth in claim 1, wherein:

said deviation detecting sensor comprises a photodetector.

7. A packaging article inclusion-proofing device for an end-sealing mechanism as set forth in claim 1, wherein:

said coincidence determining means comprises an AND circuit to one terminal of which said signal of said deviation detecting sensor is applied, and to a second terminal of which said signals of said reference timing pulse generating means are applied.

* * * * *